(12) United States Patent
Morra et al.

(10) Patent No.: US 7,914,904 B2
(45) Date of Patent: Mar. 29, 2011

(54) COMPONENT IN A COMBUSTION SYSTEM, AND PROCESS FOR PREVENTING SLAG, ASH, AND CHAR BUILDUP

(75) Inventors: Martin Mathew Morra, Glenville, NY (US); Aaron John Avagliano, Houston, TX (US); Wei Chen, Sugar Land, TX (US); Monty L. Harned, Sugar Land, TX (US); Shashishekara S. Talya, Houston, TX (US)

(73) Assignee: General Electric Company, Niskayuna, NY (US)

( * ) Notice: Subject to any disclaimer, the term of this patent is extended or adjusted under 35 U.S.C. 154(b) by 232 days.

(21) Appl. No.: 12/054,677

(22) Filed: Mar. 25, 2008

(65) Prior Publication Data
US 2009/0246500 A1 Oct. 1, 2009

(51) Int. Cl.
*C04B 35/52* (2006.01)
*C04B 35/56* (2006.01)
*B32B 9/00* (2006.01)
*B32B 19/00* (2006.01)
*B32B 15/00* (2006.01)
*C25D 5/10* (2006.01)

(52) U.S. Cl. ........ 428/663; 428/688; 428/689; 428/665; 501/88; 501/91; 501/92

(58) Field of Classification Search ............ 501/88, 501/91, 92, 96.3, 96.1; 423/344, 345; 428/688, 428/689, 698, 699, 613, 639, 663, 665, 304.4, 428/450, 457

See application file for complete search history.

(56) References Cited

U.S. PATENT DOCUMENTS

| | | | |
|---|---|---|---|
| 3,307,616 A | 3/1967 | J. Giger | |
| 4,174,971 A * | 11/1979 | Schrewelius | 501/88 |
| 5,689,898 A | 11/1997 | Renzi | |
| 5,871,820 A * | 2/1999 | Hasz et al. | 427/419.2 |
| 5,990,025 A | 11/1999 | Suyama et al. | |
| 6,211,496 B1 * | 4/2001 | Uchiyama et al. | 219/548 |
| 6,589,898 B1 * | 7/2003 | Gnesin et al. | 501/92 |
| 6,770,856 B2 | 8/2004 | Gnesin et al. | |
| 7,011,516 B2 | 3/2006 | Aust et al. | |
| 2003/0106888 A1 * | 6/2003 | Gnesin et al. | 219/553 |
| 2006/0188736 A1 | 8/2006 | Luthra et al. | |

OTHER PUBLICATIONS

PCT/US2009034253 Search Report, Sep. 24, 2009.
PCT Search Report, PCT/US2009/034253, Feb. 17, 2009.
PCT Written Opinion, PCT/US2000/034253, Feb. 17, 2009.

* cited by examiner

*Primary Examiner* — Karl E Group
*Assistant Examiner* — Noah S Wiese
(74) *Attorney, Agent, or Firm* — Ann M. Agosti (57) ABSTRACT

Disclosed herein is a component in a combustion system comprising a composite, the composite comprising silicon carbide; and a refractory metal silicide comprising a phase selected from $Rm_5Si_3$, $Rm_5Si_3C$, $RmSi_2$, and a combination thereof; wherein Rm is a refractory metal selected from molybdenum, tungsten, and a combination thereof. Also disclosed is a process for preventing slag, ash, and char buildup on a surface, comprising disposing a first surface of the composite on the surface; replacing a component comprising the surface with a component consisting of the composite; or a combination thereof.

8 Claims, 4 Drawing Sheets

COMPONENT IN A COMBUSTION SYSTEM, AND PROCESS FOR PREVENTING SLAG, ASH, AND CHAR BUILDUP

BACKGROUND

High temperature combustion systems, such as gas turbines, or gasifiers used for the gasification of coal, petroleum coke, biomass, oil refinery bottoms, or the like, generally involve reactions at temperatures in the range of about 700° C. to about 2,500° C., and under pressures as high as 100 atmospheres. Under these conditions, components in the combustion systems are exposed to reducing environments, corrosive gases and condensing acids, and are subject to attack by slag, ash, char, thermal shock, or the like, which leads to failure of the components, or of the combustion system itself.

Some of the problems associated with high temperature combustion systems is attack by and/or build up of slag, ash, char, or the like, on the surfaces of vulnerable components, that is, components which are prone to the foregoing. Slag, for example, is highly reactive with metals and ceramics. Metal components, such as metal feed injectors designed for high temperature gasification processes, suffer from corrosive attack by slag, or by oxygen, sulfur, or the like. Ceramic components, such as ceramic feed injectors, nozzle components, shields, or inserts, also suffer from a similar attack. In addition, poor mechanical attachment between different components, specifically between ceramic components and metal components, tends to lead to mechanical failure of the components, generally due to thermal shock. Component failure leads to, collateral component damage, disadvantageous plant downtime, decreased reliability over service life, and costly repair or replacement, among others. Thermal shock occurs due to rapid increase or decrease in operating temperatures. Components susceptible to thermal shock, such as nozzles, generally require the inclusion of complex mechanisms, such as active water cooling, to mitigate failure due to thermal shock.

Therefore, there exists a need for high temperature combustion systems and components thereof that are highly resistant to chemical attack by slag, thermal shock and fatigue, acid corrosion, reducing environments, and the like. Such a system can operate under high thermal gradients without the further risk of mechanical, failure. Also, the system should be resistant to fouling due to the deposition of slag, ash, or char.

SUMMARY

The above-described and other drawbacks are alleviated by a component in a combustion system comprising a composite, the composite comprising silicon carbide; and a refractory metal silicide comprising a phase selected from $Rm_5Si_3$, $Rm_5Si_3C$, $RmSi_2$, and a combination thereof; wherein Rm is a refractory metal selected from molybdenum, tungsten, and a combination thereof.

In one embodiment, a component in a combustion system comprises a composite, the composite comprising about 50 to about 85 percent by volume silicon carbide; about 4.9 to about 25 percent by volume of a phase of a refractory metal silicide selected from $Rm_5Si_3$, $Rm_5Si_3C$, and a combination thereof; about 0.1 to about 20 percent by volume of a phase of a refractory metal silicide selected from $RmSi_2$; and about 10 to about 45 percent by volume pores; wherein percent by volume is based on a total volume of the composite; wherein Rm is a refractory metal selected from molybdenum, tungsten, and a combination thereof; wherein the composite comprises the molybdenum in an amount of about 45 to about 80 percent by weight and the tungsten in an amount of about 20 to about 55 percent by weight; wherein the composite further comprises iron in an amount of about 0 to about 2 percent by weight; and wherein percent by weight is based on a total weight of molybdenum and tungsten.

Another embodiment is a process for preventing slag, ash, and char buildup on a surface, comprising disposing a first surface of a composite on the surface; replacing a component comprising the surface with a component consisting of the composite; or a combination thereof; wherein the composite comprises silicon carbide; and a refractory metal silicide comprising a phase selected from $Rm_5Si_3$, $Rm_5Si_3C$, $RmSi_2$, and a combination thereof; wherein Rm is a refractory metal selected from molybdenum, tungsten, and a combination thereof.

BRIEF DESCRIPTION OF THE DRAWINGS

Referring now to the drawings wherein like elements are numbered alike in several FIGURES.

DETAILED DESCRIPTION

Surprisingly, the present inventors have discovered that a component in a combustion system comprising a composite, the composite comprising silicon carbide, and a refractory metal silicide comprising a phase selected from $Rm_5Si_3$, $Rm_5Si_3C$, $RmSi_2$, and a combination thereof wherein Rm is a refractory metal selected from molybdenum, tungsten, and a combination thereof, is highly resistant to fouling by slag, ash, char, high temperature corrosion, reducing environments, and the like, can be disposed on a substrate without the risk of mechanical failure, and can operate under high thermal gradients without the risk of failure due to thermal shock.

There is no limitation as to what type of silicon carbide can be used in the composite. The silicon carbide can comprise a single phase, or it can comprise a plurality of phases. The silicon carbide can be coherent, that is, there exists continuity among all the silicon carbide phases. However, the silicon carbide can also be non-connected or can comprise short connected regions within the composite. In one embodiment, the silicon carbide comprises a coherent phase, in another embodiment, the silicon carbide comprises short connected regions within the composite.

In one advantageous embodiment, the silicon carbide comprises short connected regions that have a cross-sectional diameter less than about 1,000 µm (1 mm). In one embodiment, the silicon carbide comprises short connected regions that have a cross-sectional diameter less than about 700 µm, more specifically less than about 500 µm, and even more specifically less than 300 µm. In one exemplary embodiment, the silicon carbide comprises short connected regions that, have a cross-sectional diameter of about 5 to about 300 µm.

The silicon carbide can be present in the composite in an amount of about 75 to about 98 percent by volume, based on a total volume of the silicon carbide and the refractory metal silicide. In one embodiment, the silicon carbide can be present in an amount of about 80 to about 95 percent by volume, based on the total volume of the silicon carbide and the refractory metal silicide. In one advantageous embodiment, the silicon carbide can be present in an amount of about 80 to about 92 percent by volume, based on the total volume of the silicon carbide and the refractory metal silicide.

The refractory metal silicide comprises a phase selected from $Rm_5Si_3$, $Rm_5Si_3C$, and $RmSi_2$. As used herein, "Rm" represents a refractory metal selected from molybdenum and tungsten. A combination of phases, of the refractory metals, or of the phases and of the refractory metals can also be used. A "refractory metal", as used herein, is a metal having extremely high resistance to heat, corrosion, and/or wear. A metal other than molybdenum or tungsten can also be a refractors' metal, however, it is referred to as "other refractory metal" or "other metal". Non-limiting examples of other refractory metals include rhenium, tantalum, niobium, titanium, zirconium, hafnium, vanadium, chromium, iron, nickel, and cobalt. A combination of the other refractory metals can also be used.

The $Rm_5Si_3$ and $Rm_5Si_3C$ phases are collectively referred to as the "trisilicide phase" or the "trisilicide phases". These include $W_5Si_3$, $W_5Si_3C$, $Mo_5Si_3$, $Mo_5Si_3C$, $(Mo,W)_5Si_3$, $(Mo,W)_5Si_3C$, and a combination thereof. "(Mo,W)" refers to a "substitutional solid solution" phase, that is, a phase wherein molybdenum and tungsten are both present. The $Rm_5Si_3C$ phase is further known as a "Novotny" or "Novotny" phase.

The $RmSi_2$ phase is referred to as the "disilicide phase" or the "disilicide phases". St includes $MoSi_2$, $WSi_2$, $(Mo,W)Si_2$, and a combination thereof.

The disilicide and trisilicide phases are collectively referred to as the refractory metal silicide or the refractory metal silicides.

The refractory metal silicides can be present in the composite in an amount of about 2 to about 25 percent by volume, based on the total volume of the silicon carbide and the refractory metal silicide. In one embodiment, the refractory metal silicides can be present in an amount of about 5 to about 20 percent by volume, based on the total volume of the silicon carbide and the refractory metal silicide. In one advantageous embodiment, the refractory metal silicides can be present in an amount of about 8 to about 20 percent by volume, based on the total volume of the silicon carbide and the refractory metal silicide.

Based on the total volume of the silicon carbide and the refractory metal silicide, in one embodiment, the $Rm_5Si_3C$ phase is present in an amount of about 2 to about 15 percent by volume, and the $RmSi_2$ phase is present in an amount of about 0 to about 10 percent by volume. In another advantageous embodiment, the $Rm_5Si_3C$ phase is present in an amount of about 3 to about 12 percent by volume, more specifically in an amount of about 5 to about 12 percent by volume, and the $RmSi_2$ phase is present in an amount of about 2 to about 8 percent by volume, based on the total volume of the silicon carbide and the refractory metal silicide.

There is no particular limitation as to the ratio of molybdenum to tungsten used in the composite, and this ratio can be adjusted according to the desired properties of the composite by a person of ordinary skill in the art. Not wishing to be bound by theory, but it is believed that an increase in the concentration of molybdenum produces a composite having a lighter weight, that is, less dense, and further increases heat resistance to air at temperatures of greater than about 1,500° C. On the other hand, it is believed that an increase in the concentration of tungsten produces a composite having an increased resistance to thermal shock, and an improved compatibility with the silicon carbide.

In one embodiment, the refractory metal silicide comprises about 0 to about 97 percent by weight molybdenum, and about 3 to about 100 percent by weight tungsten, based on a total weight of molybdenum and tungsten. In one advantageous embodiment, the refractory metal silicide comprises about 45 to about 80 percent by weight molybdenum, and about 20 to about 55 percent by weight tungsten, based on the total weight of molybdenum and tungsten.

The ratio of molybdenum and tungsten can be the same or different within the different phases of the refractory metal silicides. In one embodiment, the refractory metal silicide can comprise a different ratio of molybdenum and tungsten within the disilicide phases and within the trisilicide phases.

Thus, in one embodiment, the refractory metal silicide comprises about 30 to about 90 percent by weight molybdenum, and about 10 to about 70 percent by weight tungsten, based on a total weight of molybdenum and tungsten within the disilicide phases. In one advantageous embodiment, the refractory metal silicide comprises about 50 to about 80 percent by weight molybdenum, and about 20 to about 50 percent by weight tungsten, based on the total weight of molybdenum and tungsten within the disilicide phases.

In another embodiment, the refractory metal silicide comprises about 20 to about 90 percent by weight molybdenum, and about 10 to about 80 percent by weight tungsten, based on a total weight of molybdenum and tungsten within the trisilicide phases. In one advantageous embodiment, the refractory metal silicide comprises about 40 to about 70 percent by weight molybdenum, and about 30 to about 60 percent by weight tungsten, based on the total weight of molybdenum and tungsten within the trisilicide phases.

The composite can further comprise another refractory metal such as rhenium, tantalum, niobium, titanium, zirconium, hafnium, vanadium, chromium, iron, nickel, cobalt, or a combination thereof, with the proviso that it does not adversely affect the composite. The composite can also comprise other elements such as boron, germanium, aluminum, magnesium, barium, strontium, calcium, sodium, potassium, yttrium, scandium, a lanthanide element, or a combination thereof.

The foregoing other refractory metals and elements can be present in an amount of less than about 10 percent by weight, based on the total weight of the molybdenum and tungsten, with the proviso that the composite is not adversely affected. In one embodiment, the foregoing other refractory metals and elements can be present in an amount of less than about 5 percent by weight, based on the total weight of the molybdenum and tungsten. In one advantageous embodiment, the foregoing other refractory metals and elements can be present in an amount of less than about 2 percent by weight, based on the total weight of the molybdenum and tungsten. In one exemplary embodiment, the foregoing other refractory metals and elements can be present in an amount of about 0.1 to about 2 percent by weight, based on the total weight of the molybdenum and tungsten. In another exemplary embodiment, iron is present in an amount of about 0.1 to about 2 percent by weight, based on the total weight of the molybdenum and tungsten, while the composite is free of the rest of the foregoing other refractory metals and elements. Not wishing to be bound by theory, but it is believed that the iron is an impurity incorporated during the manufacture of the composite.

In one embodiment, the composite further comprises pores. A total volume of the composite can be defined as the total volume of the pores, the silicon carbide, and the refractory metal silicides.

The pores can have a cross-sectional diameter of less than about 1,000 μm (1 mm). Specifically, the pores can have a cross-sectional diameter of about 1 to about 800 μm, and more specifically about 100 to about 600 μm. In one advantageous embodiment, the pores can have a cross-sectional diameter of about 200 to about 500 μm.

The composite can comprise about 10 to about 45 percent by volume of the pores, and about 55 to about 90 percent by volume of the total silicon carbide and refractory metal silicides, based on the total volume of the composite. In one advantageous embodiment, the composite can comprise about 15 to about 28 percent by volume of the pores, and about 72 to about 85 percent by volume of the total silicon carbide and refractory metal silicides, based on the total volume of the composite In one embodiment, the composite is free of silicon and carbon other than those present in the silicon carbide and refractory metal silicide phases, that is, the silicon carbide and the refractory metal silicide comprise 100 percent of the amount of carbon and 100 percent of the amount of silicon in the composite. For example, the composite can be free of carbon impurities or silicon impurities that are not part of the silicon carbide phase of the refractory metal silicide phase.

The composite can comprise a low specific electrical resistivity of about 0.000001 to about 0.5 ohm·cm, that is, the composite can comprise an enhanced electrical conductivity when compared to other similar composites, such as silicon carbide based composites comprising refractory metal silicides. While not wishing to be bound by theory, but it is believed that the enhanced electrical conductivity is produced by the specific ratios of the silicon carbide to the refractory metal silicides, along with the specific ratios of the disilicide phases to the trisilicide phases, and the specific ratios of the tungsten to the molybdenum, as disclosed herein.

This enhanced electrical conductivity is an advantageous property of the present composite. While the composite can be brazed, soldered, alloyed, or the like, to a substrate, such as a metal substrate, the composite can also be directly welded onto a metal substrate without the use of an intermediate layer, due to the enhanced electrical conductivity. When welded to a substrate, the composite is in direct contact with the substrate, and an alloy is formed at the interface between the composite and the substrate, which greatly reduces the risk of mechanical failure when compared to the same composite that has been brazed, soldered, or otherwise disposed on the substrate.

In one embodiment, the specific electrical resistivity is from about 0.0001 to about 0.5 ohm·cm. In one exemplary embodiment, the specific electrical resistivity is from about 0.001 to about 0.03 ohm·cm.

The composite can be manufactured according to any suitable technique available to one with ordinary skill in the art for the manufacture of such composites. For example, a hollow form comprising silicon carbide can be shaped into a desired article, and then filled with the refractory metal silicides, and sintered. Or, for coatings, a coating can be formed by alloying the composite constituents using a technique such as electric arc or electric spark. The manufacture of composite materials is described in U.S. Pat. Nos. 6,589,898, and 6,770,856.

The composites disclosed herein can be obtained from the Institut Fiziki Tverdogo Tela Rossiiskoi Akademii Nauk, Chernogolovka, Russia, under the tradenames REFSIC, REFSICOAT, and REFSICUT. The material REFSICUT can be advantageously used herein.

The component in the combustion system which comprises the composite can define any component wherein resistance to slag, ash, char, thermal shock, elevated temperature, corrosion, erosion reduction, thermal gradients, or the like, or a combination thereof, is advantageous. Non-limiting examples of such components include a gasifier, a gasification feed injector, an injector nozzle, a gasifier thermocouple, a gasifier thermocouple well, a gasifier sheath, art injector barrel, an injector barrel cooling coil, a gasification feed injector shield, a gasifier lining, a gasification radiant syngas heat exchanger component, a gasification convective syngas heat exchanger component, a posimetric pump transition piece, a posimetric dry coal feed pump transition piece, a posimetric dry coal feed pump abutment, a posimetric dry coal feed pump rotor disk, a turbine bucket, a turbine blade, a turbine nozzle, a turbine rotor, a turbine disk, a turbine vane, a turbine stator, a turbine shroud, a turbine combustor, or a combination thereof.

In one embodiment, the composite can be manufactured as a layer, a plate, a ring, a block, or the like, and then disposed on the component of the combustion system that is adversely affected by slag, ash, char, thermal shock, or the like. In another embodiment, the component of the combustion system that is adversely affected by slag, ash, char, thermal shock, or the like, can be manufactured entirely out of the composite, and introduced into the combustion system as a replacement part.

In addition, the component in the combustion system which comprises the composite exhibits improved wear resistance and/or abrasion resistance at the elevated temperatures, and can be further advantageous when in addition to being exposed to slag, ash, char, thermal shock, or the like, it is also exposed to abrasion and wear. The component in the combustion system which comprises the composite can have a smooth surface finish. In one embodiment, the component in the combustion system which comprises the composite has a class A surface finish.

One embodiment is a process for preventing slag, ash, and char buildup on a surface, comprising disposing a first surface of a composite on the surface, replacing a component comprising the surface with a component consisting of the composite, or a combination thereof wherein the composite comprises silicon carbide, and a refractory metal silicide comprising a phase selected from $Rm_5Si_3$, $Rm_5Si_3C$, $RmSi_2$, and a combination thereof, wherein Rm is a refractory metal selected from molybdenum, tungsten, and a combination thereof. That is, the composite disclosed above. The composite can comprise a specific resistivity of about 0.000001 to about 0.5 ohm·cm. The component can further have a smooth surface finish, and/or a class A surface finish. The component can further exhibit improved wear resistance and/or abrasion resistance at elevated temperatures.

Disposing, replacing, or a combination thereof can comprise, inter alia, welding the composite to a metal substrate, wherein the composite is in direct contact with the metal substrate.

The metal substrate can define the above surface, a component in direct contact with the component comprising the above surface, or a combination thereof.

The component comprising the above surface can advantageously define a gasifier, a gasification feed injector, an injector nozzle, a gasifier thermocouple well, a gasifier thermocouple sheath, an injector barrel, an injector barrel cooling coil, a gasification feed injector shield, a gasifier lining, a gasification radiant syngas heat exchanger component, a gasification convective syngas heat exchanger component, a posimetric pump transition piece, a posimetric pump dry coal feed transition piece, a posimetric dry coal feed pump abutment, a posimetric pump dry coal feed rotor disk, a turbine bucket, a turbine blade, a turbine nozzle, a turbine rotor, a turbine disk, a turbine vane, a turbine stator, a turbine shroud, a turbine combustor, or a combination thereof.

Figure 1:
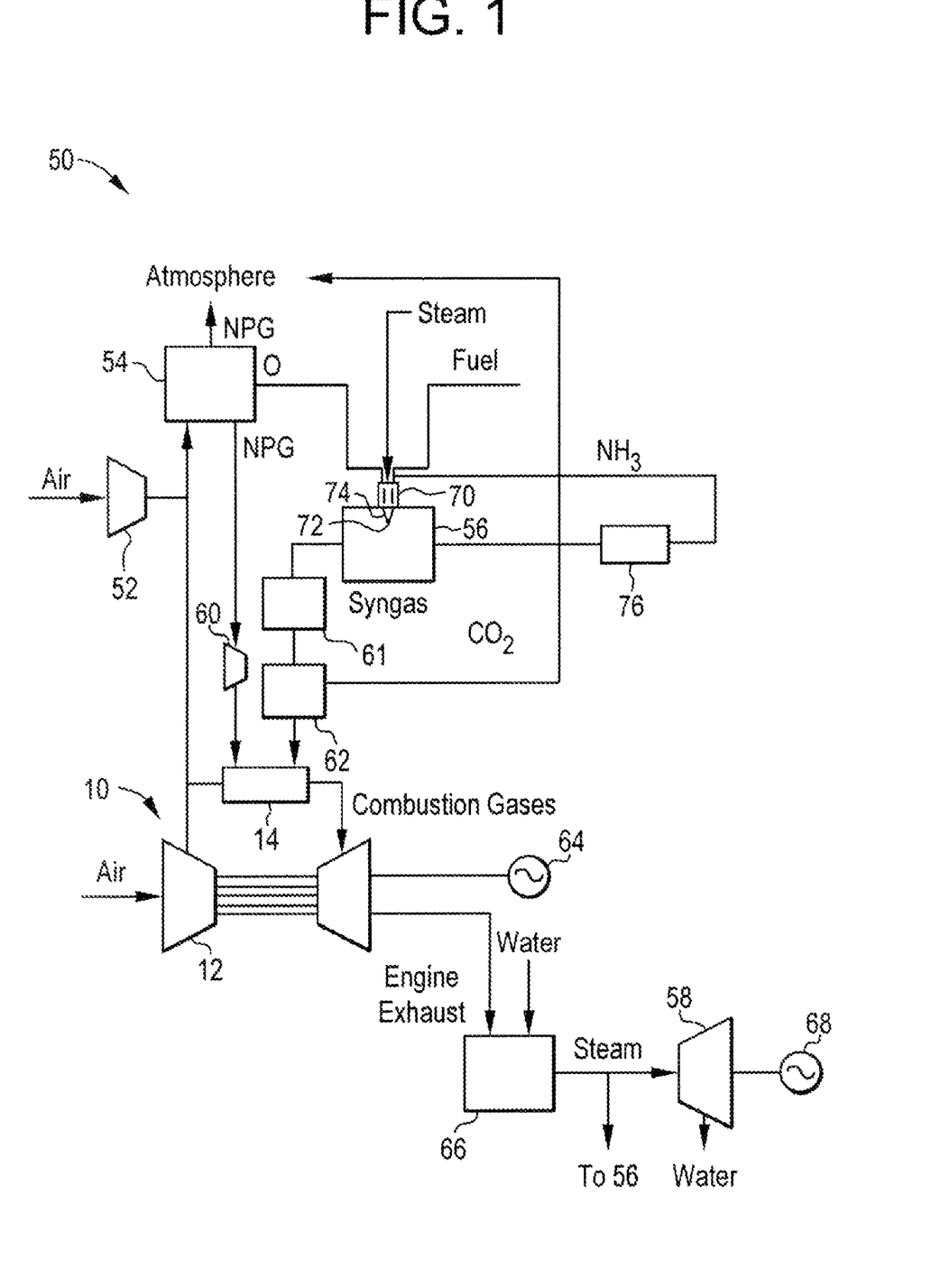
FIG. 1 is a schematic diagram of an exemplary combustion system known as an integrated gasification combined-cycle (IGCC) power generation system.

Using an IGCC as an example, the composite can be applied to numerous surfaces prone to slag, ash, and char buildup, or can be used as a replacement component for numerous components comprising surfaces prone to slag, ash, and char buildup. FIG. 1 is a schematic diagram of an exemplary combustion system that would benefit from the incorporation of the composite. The exemplary combustion system is an IGCC power generation system 50 and is not intended to be limiting with regard to the type and configuration of combustion system to which the composite as described herein is advantageously used to prevent slag corrosion as well as slag, ash, char buildup, erosion and thermal shock. The composite is suitable for any combustion system where slag corrosion and slag, ash, char buildup, erosion and thermal shock are issues. The exemplary IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. The gasifier interior walls are typically formed of a ceramic material.

In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and will be referred to herein as "nitrogen process gas". The nitrogen process gas can also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 52 is then passed through heat exchanger 61, which may be of a radiant or connective design and is used to cool the syngas that exits the gasifiers. The cooled syngas may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 52 for generating the syngas.

In the exemplary IGCC, gasifier 56 includes an injection nozzle 70 extending through gasifier 56. Injection nozzle 70 includes a nozzle tip 72 at a distal end 74 of injection nozzle 70. In the exemplary embodiment, injection nozzle 70 is configured to direct a stream of ammonia proximate nozzle tip 72 such that the stream of ammonia facilitates reducing a temperature of at least a portion of nozzle tip 72.

In the exemplary embodiment, IGCC system 50 includes a syngas condensate stripper 76 configured to receive condensate from a stream of syngas discharged from gasifier 56.

Advantageously, the composite can be used to substantially reduce and/or prevent build up of slag and/or ash particles. For example, the composite can be applied to internal surfaces of the gasifier 56, the injection nozzles 70 utilized to deliver the fuel and/or oxygen into the gasifier, the heat exchanger surfaces 61 in large heat exchangers into which the hot (1,650° C.) syngas passes after exiting the gasifier that are used for heat recovery and to cool the syngas before if can be cleaned, and the like. In the alternative, the foregoing components can be manufactured entirely of the composite. Advantages of the composite for heat exchanger surfaces is primarily for anti-fouling, and for the nozzle application, the composite reduces and/or prevents slag corrosion or sticking. As a result, chemical attack by molten slag, glasses, ceramics ashes and the like are prevented, heat transfer through metallic heat exchangers surfaces is increased, and plugging of orifices or channels is prevented.

In one embodiment, a nozzle, gasifier, injector, or the like, comprising the composite, are operational without the use of a cooling apparatus.

The business benefits are numerous; life extension for components in combustion atmospheres, anti-stick or anti-fouling surfaces in ash containing combustion gases, non reactive surfaces for use on components exposed to molten slag, increase efficiency for heat exchanger surfaces in combustion gas streams, and the like.

The invention is further illustrated by the following non-limiting examples.

Comparative Example

Figure 2:
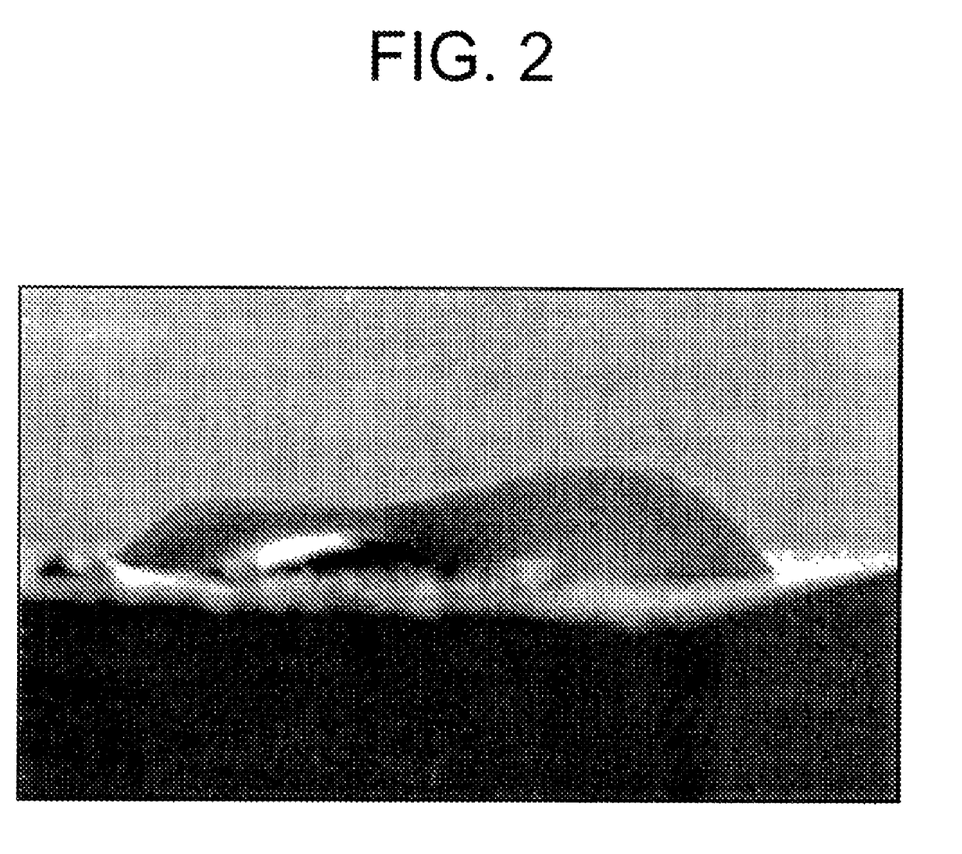
FIG. 2 is a pictorial illustration of the wetting of melted slag disposed on a silicon carbide substrate.
Figure 3:
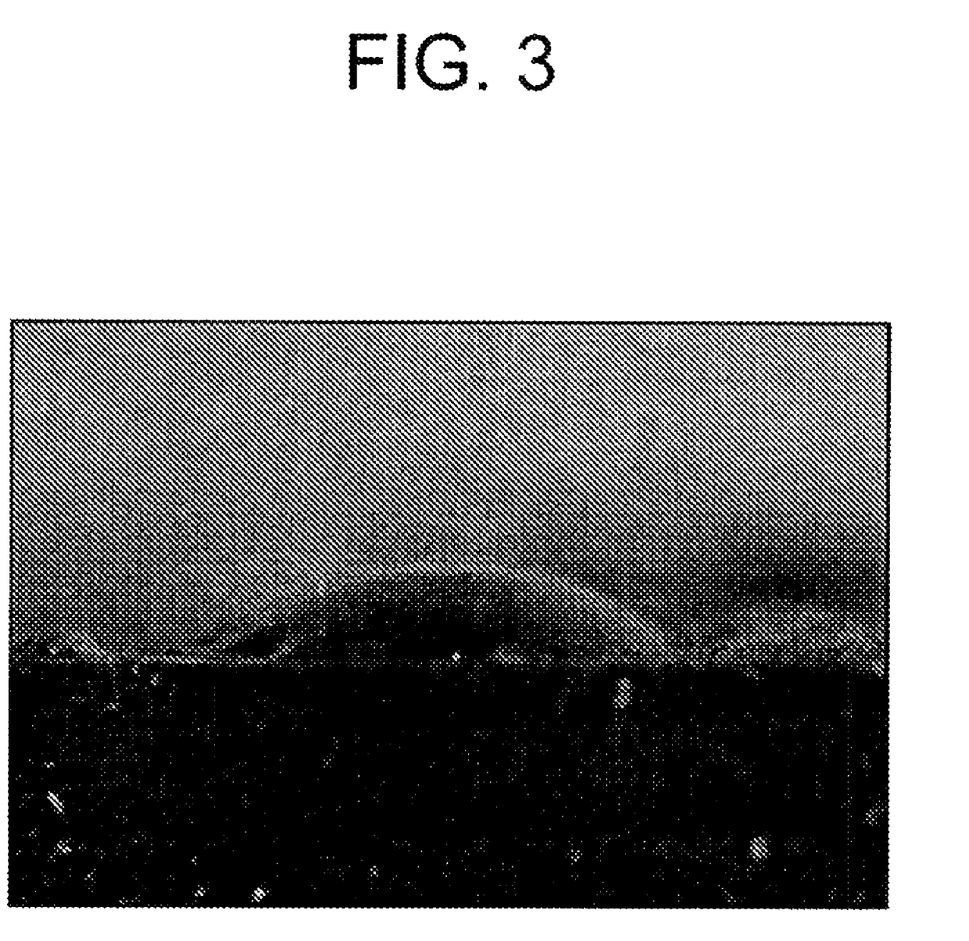
FIG. 3 is a pictorial illustration of the wetting of melted slag disposed on a silicon carbide substrate.

In this example, a slag piece was positioned onto a substrate consisting of silicon carbide, and a substrate consisting of silicon carbide, a refractory metal silicide, and carbon in the form of graphite, and subsequently heated to melting in a high temperature vacuum furnace. FIG. 2 pictorially illustrates the slag piece wetting the former, which exhibited a reaction with the slag. The wetting angle was about 50°. FIG. 3 pictorially illustrates the slag piece wetting the latter, which also exhibited a reaction with the slag. The wetting angle was about 35°.

Example

Figure 4:
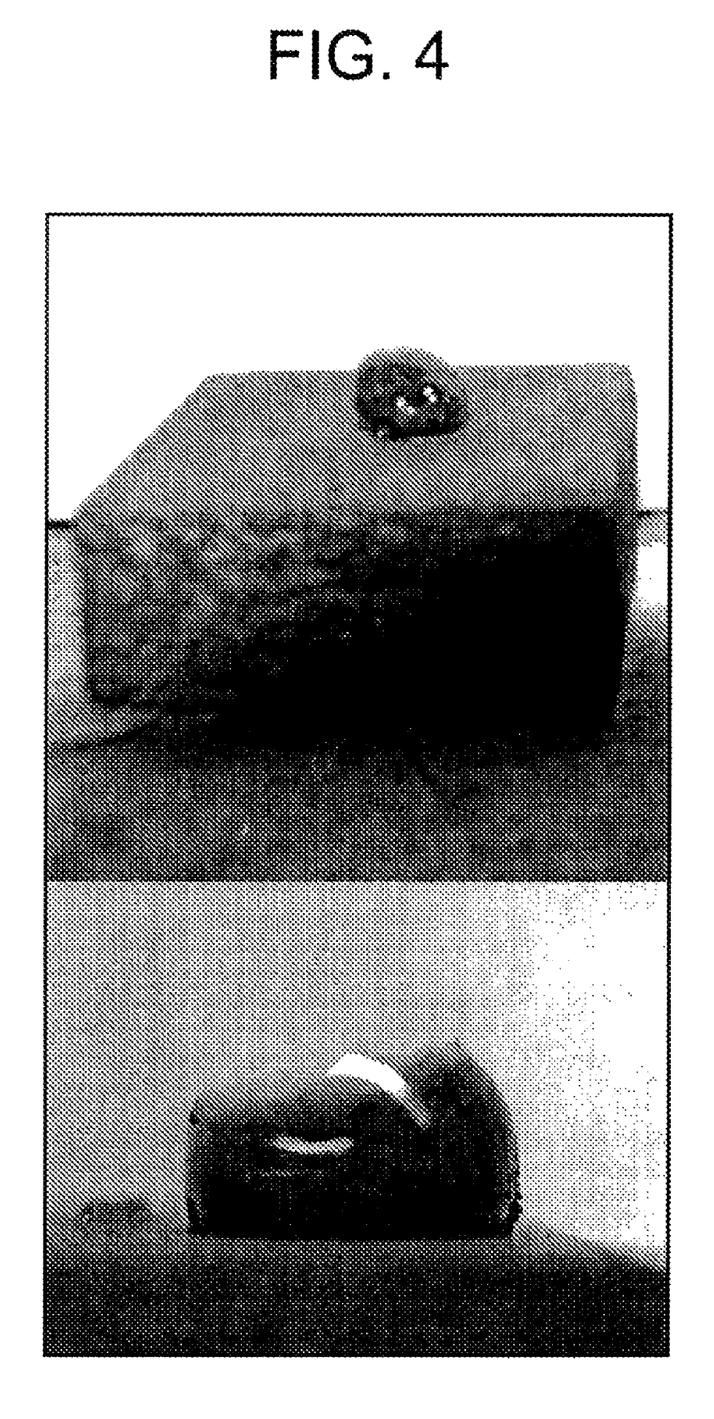
FIG. 4 is a pictorial illustration of the beading of melted slag disposed on a surface of the composite disclosed herein.

In this example, a slag piece was positioned onto a substrate comprising the composite. FIG. 4 pictorially illustrates the lack of wetting of the composite by the slag piece, which instead formed beads indicating lack of wetting and lack of reaction. The beading angle was greater than 90° with respect to the surface of the substrate, and was about 100°.

This written description uses figures and examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety unless otherwise indicated. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Further, it is understood that disclosing a range is specifically disclosing all ranges formed from any pair of any upper range limit and any lower range limit within this range, regardless of whether ranges are separately disclosed. It is not intended that, the scope of the invention be limited to the specific values recited when defining a range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A process for preventing slag, ash, and char buildup on a surface, comprising:
    disposing a composite on the surface;
    replacing a component comprising the surface with a component consisting of the composite; or
    a combination thereof;
    wherein the composite comprises:
        silicon carbide; and
        a refractory metal silicide comprising a phase selected from $Rm_5Si_3$, $Rm_5Si_3C$, $RmSi_2$, and a combination thereof;
    wherein Rm is a refractory metal selected from molybdenum, tungsten, and a combination thereof; and
    exposing the composite to slag, ash or char in a heated environment, wherein the slag, ash or char does not substantially wet the surface of the composite;
    wherein disposing, replacing, or a combination thereof comprises welding the composite to a metal substrate, and further wherein the composite is in direct contact with the metal substrate.

2. The process of claim 1, wherein disposing, replacing, or a combination thereof comprises welding, brazing, alloying, electric arc, electric spark, or a combination thereof.

3. The process of claim 1, wherein the composite comprises a specific resistivity of about 0.000001 to about 0.5 ohm·cm.

4. The process of claim 1, wherein the metal substrate defines the surface, a component in direct contact with the component comprising the surface, or a combination thereof.

5. The process of claim 1, wherein a component comprises the surface, and wherein the component defines a gasifier, a gasification feed injector, an injector nozzle, a gasifier thermocouple, a gasifier thermocouple well, a gasifier thermocouple sheath, an injector barrel, an injector barrel cooling coil, a gasification feed injector shield, a gasifier lining, a gasification radiant syngas heat exchanger component, a gasification convective syngas heat exchanger component, a posimetric pump transition piece, a posimetric pump dry coal feed transition piece, a posimetric dry coal feed pump abutment, a posimetric pump dry coal feed rotor disk, a turbine bucket, a turbine blade, a turbine nozzle, a turbine rotor, a turbine disk, a turbine vane, a turbine stator, a turbine shroud, a turbine combustor, or a combination thereof.

6. A composite component for use in a combustion system, the composite comprising:
    silicon carbide; and
    a refractory metal silicide comprising a phase selected from $Rm_5Si_3$, $Rm_5Si_3C$, $RmSi_2$, and a combination thereof;
    wherein Rm is a refractory metal selected from molybdenum, tungsten, and a combination thereof and wherein the component comprises a metal substrate and the composite is welded to the metal substrate and is in direct contact therewith.

7. A composite component for use in a combustion system, the composite comprising:
    about 50 to about 85 percent by volume silicon carbide;
    about 4.9 to about 25 percent by volume of a phase of a refractory metal silicide selected from $Rm_5Si_3$, $Rm_5Si_3C$, and a combination thereof;
    about 0.1 to about 20 percent by volume of a phase of a refractory metal silicide selected from $RmSi_2$; and
    about 10 to about 45 percent by volume pores;
    wherein percent by volume is based on a total volume of the composite;
    wherein Rm is a refractory metal selected from molybdenum, tungsten, and a combination thereof;
    wherein the composite comprises the molybdenum in an amount of about 45 to about 80 percent by weight and the tungsten in an amount of about 20 to about 55 percent by weight;
    wherein the composite further comprises iron in an amount of about 0 to about 2 percent by weight; and wherein percent by weight is based on a total weight of molybdenum and tungsten;
    and wherein the component comprises a metal substrate and the composite is welded to the metal substrate and is in direct contact therewith.

8. A process for preventing slag, ash, and char buildup on a surface in a combustion system, comprising:
    disposing a composite on the surface;
    replacing a component comprising the surface with a component consisting of the composite; or
    a combination thereof;
    wherein the composite comprises:
        silicon carbide; and
        a refractory metal silicide comprising a phase selected from $Rm_5Si_3$, $Rm_5Si_3C$, $RmSi_2$, and a combination thereof;
    wherein Rm is a refractory metal selected from molybdenum, tungsten, and a combination thereof
    wherein disposing, replacing, or a combination thereof comprises welding the composite to a metal substrate, and further wherein the composite is in direct contact with the metal substrate.

* * * * *

UNITED STATES PATENT AND TRADEMARK OFFICE
CERTIFICATE OF CORRECTION

| | | |
|---|---|---|
| PATENT NO. | : 7,914,904 B2 | |
| APPLICATION NO. | : 12/054677 | |
| DATED | : March 29, 2011 | |
| INVENTOR(S) | : Morra et al. | |

It is certified that error appears in the above-identified patent and that said Letters Patent is hereby corrected as shown below:

In Column 1, Line 45, delete "mechanical," and insert -- mechanical --, therefor.

In Column 3, Line 29, delete ""Novotny"" and insert -- "Novotnyi" --, therefor.

In Column 3, Line 31, delete "St" and insert -- It --, therefor.

In Column 6, Line 10, delete "art" and insert -- an --, therefor.

In Column 7, Line 66, delete "connective" and insert -- convective --, therefor.

In Column 8, Line 30, delete "if" and insert -- it --, therefor.

In Column 9, Line 26, delete "that," and insert -- that --, therefor.

Signed and Sealed this
Twelfth Day of July, 2011

David J. Kappos
*Director of the United States Patent and Trademark Office*